United States Patent [19]

Miller

[11] 4,370,745
[45] Jan. 25, 1983

[54] FAIL-SAFE TRANSMISSION SYSTEM
[75] Inventor: Stewart E. Miller, Locust, N.J.
[73] Assignee: Bell Telephone Laboratories, Incorporated, Murray Hill, N.J.
[21] Appl. No.: 206,720
[22] Filed: Nov. 14, 1980
[51] Int. Cl.³ .................. G06F 11/08; H03K 13/32
[52] U.S. Cl. .................. 371/8; 371/30; 375/40; 455/8
[58] Field of Search ............ 371/30, 8, 68, 37; 455/8, 9; 375/34, 38, 40

[56]  References Cited
U.S. PATENT DOCUMENTS 3,409,875 11/1968 De Jager et al. ............ 371/68
3,444,516  5/1969 Lechleider ................. 371/68
3,452,328  6/1969 Hsiao et al. ............... 371/37
3,526,837  9/1970 Zegers et al. .............. 371/8
4,081,790  3/1978 Yamamoto et al. ......... 371/68

Primary Examiner—Charles E. Atkinson
Attorney, Agent, or Firm—S. Sherman

[57] ABSTRACT

Transmission configurations are described for providing usable service despite the complete interruption of one or more of several transmission links. This is accomplished by encoding (11) the information content of each of a plurality of input signals ($S_1, S_2 \ldots S_n$) into a multiplicity of encoded signals ($s_1, s_2 \ldots s_m$) for simultaneous transmission along a multiplicity of transmission links ($13.1, 13.2 \ldots 13.m$). At the receiver, a decoder (12) recovers the individual input signals. By accepting temporarily either a bandwidth or a signal-to-noise reduction, service is continued even though one or more of the transmission links fails.

7 Claims, 15 Drawing Figures

FAIL-SAFE TRANSMISSION SYSTEM

TECHNICAL FIELD

This invention relates to network configurations for providing usable transmission service notwithstanding the complete interruption of one of several transmission links.

BACKGROUND OF THE INVENTION

The provision of service in the event of interruption of a transmission link has conventionally been accomplished by means of standby transmission links. Whereas one standby link may be provided for several working links, this practice does not provide a solution for a transmission configuration of potential interest using optical fibers. For example, it may be economically advantageous to handle two or more fibers as a single unit, forming them into a tape-like array and mating them with repeaters using a single plug-in connector. The detectors, LEDs, and lasers can be fabricated in arrays on single chips of semiconductors, and the electronics made on a single chip for several repeaters. When maintenance is required on any one of these elements, all of the transmission links passing through the single tape assembly are interrupted. Thus, there is a strong motivation to arrange the transmission so that usable (but somewhat degraded) transmission can be maintained when a link is broken (perhaps only for a few seconds).

SUMMARY OF THE INVENTION

In a fail-safe transmission system in accordance with the present invention, the information content of one or more input signals is encoded into a multiplicity of encoded signals such that information relating to each input signal is included in at least two encoded signals. Each encoded signal is then trasmitted along a different one of a multiplicity of transmission links to a decoder which recovers the original signals.

It is an advantage of the present invention that by temporarily accepting either a signal-to-noise reduction or a bandwidth reduction, service is not interrupted even when one of the transmission links fails completely. It is a further advantage of the invention that nonproductive standby transmission links are not required.

DETAILED DESCRIPTION

Figure 1:
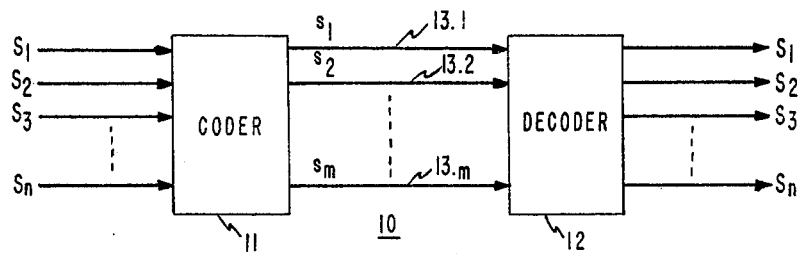
FIG. 1 shows a fail-safe transmission system in accordance with the invention.

Referring to the drawings, FIG. 1 shows a transmission system 10 in accordance with the present invention comprising a coder 11 and a decoder 12 interconnected by means of m independent transmission links 13.1, 13.2 ... 13.m. A plurality of n input signals, $S_1, S_2 ... S_n$, where n is an integer equal to or greater than one, are applied to coder 11 which produces m encoded signals $s_1, s_2 ... s_m$, where m is an integer equal to or greater than two. Each encoded signal is transmitted over a different transmission link to decoder 12 which recovers the original signals $S_1, S_2 ... S_n$.

Figure 2:
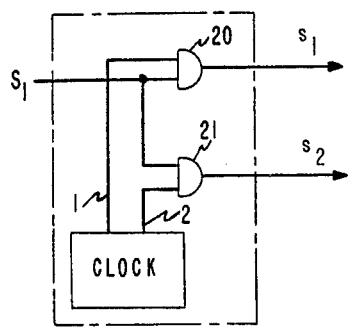
FIG. 2 shows a first embodiment of a coder for practicing the invention.
Figure 3:
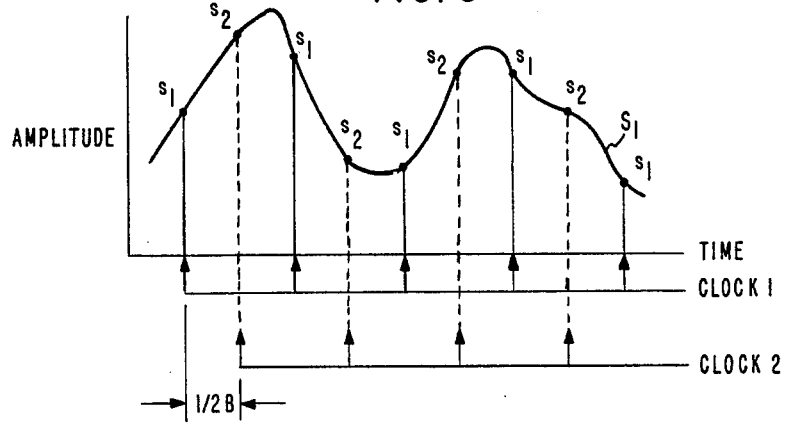
FIG. 3 illustrates the operation of the coder of FIG. 2.

To ensure that the information content of each input signal can be recovered, notwithstanding the complete failure of one of the transmission links, the encoding by coder 11 is such that information relating to each input signal is included in at least two of the encoded signals. Thus, service is not completely interrupted even when one transmission link fails. This principle is illustrated for the simple case wherein an input signal is encoded in the manner illustrated in FIGS. 2 and 3, and transmitted along two separate links. In the coder shown in FIG. 2, a single input signal $S_1$ of bandwidth B is sampled at a rate of at least 2B times a second. However, sampling is done by means of two separate sets of clock pulses 1 and 2 so as to produce two separate pulse trains $s_1$ and $s_2$ displaced in time by 1/2B seconds. The first pulse train $s_1$ is generated when clock 1 enables a first AND-gate 20 of the coder. The second pulse train $s_2$ is generated when clock 2 enables a second AND-gate 21. The sampling process is illustrated in FIG. 3 which shows an input signal $S_1$ and the resulting samples which form the signals $s_1$ and $s_2$. These can be transmitted directly along a pair of transmission links 13.1 and 13.2 or they can be further encoded into binary signals prior to transmission. In a carrier system, the sample signals are used to modulate a carrier signal prior to transmission.

Figure 4:
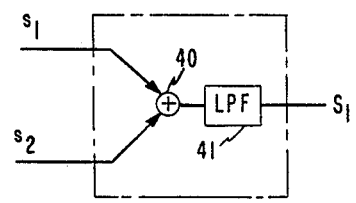
FIG. 4 illustrates a decoder for recovering the signals encoded by the coder of FIG. 2.

In whatever form the encoded signal is transmitted, the information content present in each of the signals $s_1$ and $s_2$ is recovered by the decoder at the output ends of the transmission links and added together to reconstitute the original input signal $S_1$. FIG. 4 shows a decoder comprising an adder 40 and a lowpass filter (LPF) 41 of bandwidth B.

If, at any time during the transmission of signals $s_1$ and $s_2$, one of the links fails, one bit stream is lost. This reduces by one-half the bandwidth of the recovered signal. When this occurs, the bandwidth of lowpass filter 41 at the decoder is advantageously reduced by a factor of two. A further improvement can be realized if, simultaneously, the bandwidth of the signal to be transmitted (i.e., $S_1$) is also reduced by a factor of two.

Figure 5:
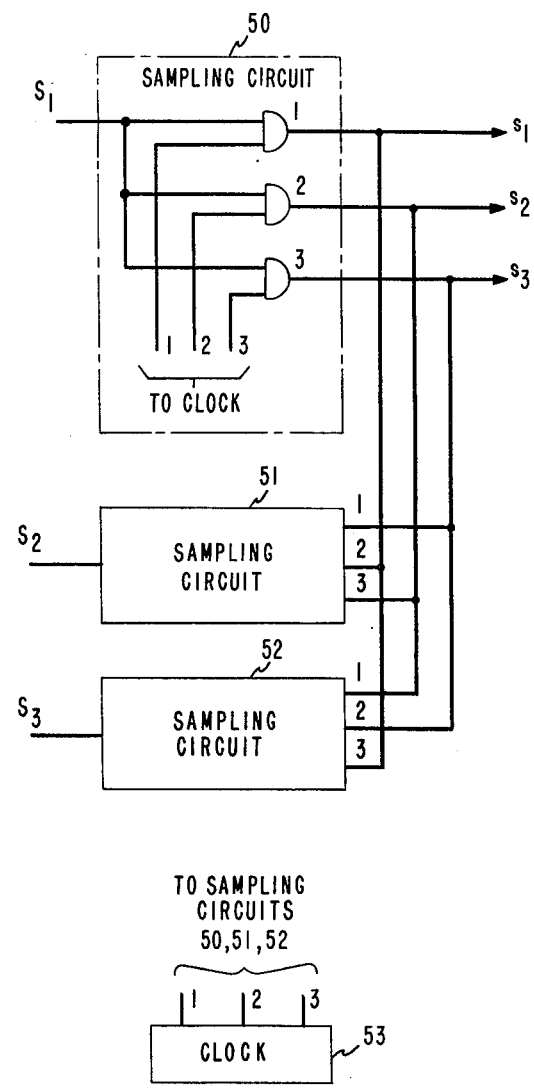
FIG. 5 shows a coder for encoding three signals.

While illustrating the principles of the invention, it is apparent that the arrangement described above is not the most efficient. For example, it uses two transmission links to send one signal, and loses half the information when one link is interrupted. These deficiencies can be avoided by encoding more input signals and sending the encoded portions over more links, as illustrated in FIG. 5. In this arrangement, three input signals are sampled by three clock pulse trains 1, 2 and 3, displaced in time relative to each other, and multiplexed for transmission along three separate links. Thus, a pulse train of samples of signal $S_1$ associated with clock 1 are combined with a pulse train of samples of signal $S_2$ associated with clock 2, and a pulse train of samples of signal $S_3$ associated with clock 3 to form encoded signal $s_1$. Similarly, appropriate samples of signals $S_1$, $S_2$ and $S_3$ are combined, as shown, to form encoded signals $s_2$ and $s_3$. Thus, while three transmission links are used, they serve to transmit three input signals. Furthermore, if one link is disabled, only a third of the samples is lost. The effect of this loss can be reduced by having the decoder "fill in" a missing sample by using the previous value sample amplitude if one set of samples is missing for more than one sampling instant. Alternatively, the decoder can "guess" at the missing sample by averaging a previous sample and a succeeding sample to provide the missing sample.

When the signal to be transmitted is digital in nature, it is important not to lose a significant number of digits. One performance compromise that can be imposed upon the system for fail-safe digital operation is a reduced signal-to-noise ratio during the temporary "trouble" condition. This, of course, requires that the system be designed to operate at a higher than minimum signal-to-noise ratio when transmitting normally.

Figure 6:
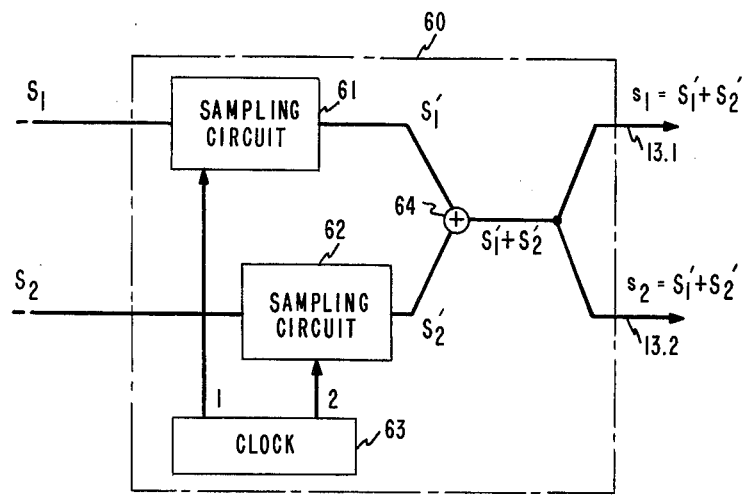
FIG. 6 illustrates a coder for encoding digital signals.

FIG. 6, now to be considered, illustrates a coder 60 configuration for digital fail-safe operation intended, for purposes of explanation, to encode two synchronized input signals $S_1$ and $S_2$ having the same baud rate. The coder comprises a pair of sampling circuits 61 and 62 which sample the input signals $S_1$ and $S_2$ at intervals defined by clock pulses 1 and 2, respectively, derived from a clock source 63. The output signals $S_1'$ and $S_2'$ from the sampling circuits are added together in a summing circuit 64 and the combined signal, $S_1' + S_2'$, is coupled to each of two transmission links 13.1 and 13.2 (i.e., $s_1 = s_2 = S_1' + S_2'$).

Figure 7:
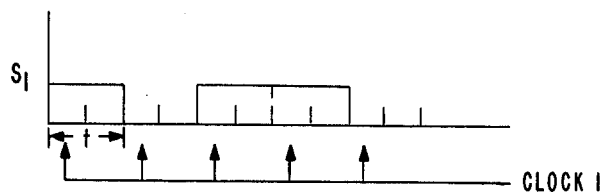
FIGS. 7, 8, 9, 10 and 11 illustrate the operation of the coder of FIG. 6.
Figure 8:
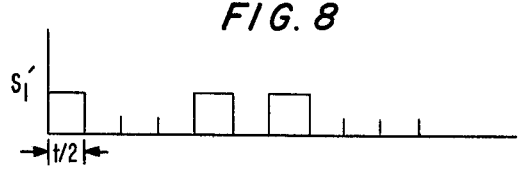
Figure 9:
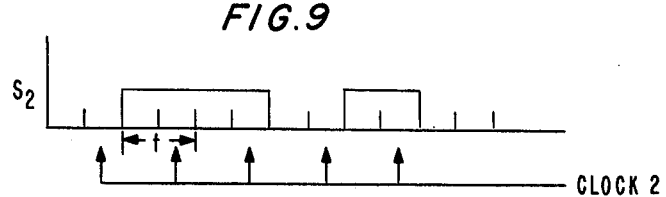
Figure 10:
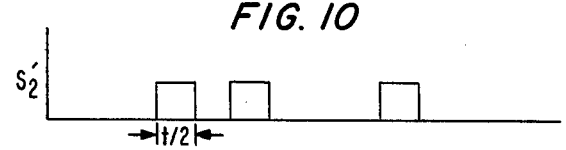
Figure 11:
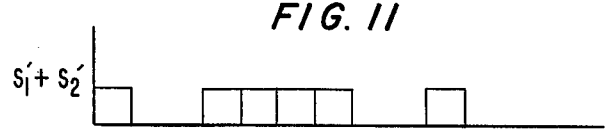

FIGS. 7, 8, 9, 10 and 11 illustrate the signal processing implemented by the coder. Assuming a signal $S_1$ as shown in FIG. 7, clock 1 samples the first half of each time slot and generates an output signal having half the pulse width. Thus, signal $S_1'$, shown in FIG. 8, is the same as signal $S_1$, except each output pulse has a pulse width t/2, or half the width of the corresponding pulses present in signal $S_1$. Similarly, clock 2 samples signal $S_2$, as illustrated in FIG. 9. However, clock 2 is delayed half a time slot relative to clock 1 so that it samples the second half of each time slot so as to produce output $S_2'$ shown on FIG. 10. Signals $S_1'$ and $S_2'$ are then added to obtain the combined signal shown in FIG. 11. This higher speed pulse stream is carried along two independent transmission links to a decoder where the original signals are recovered.

Figure 12:
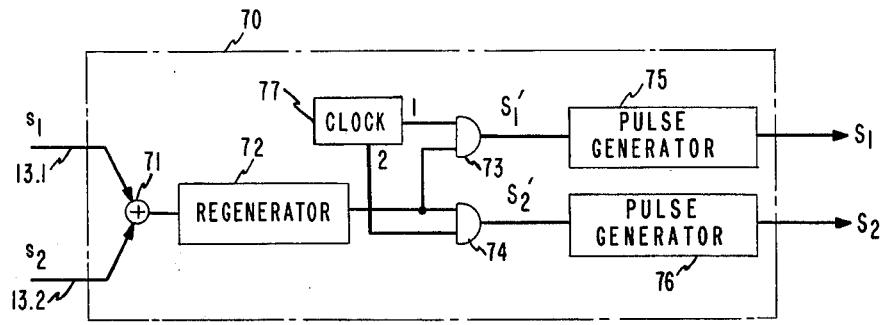
FIG. 12 shows a decoder for use with the coder of FIG. 6.

FIG. 12 shows an illustrative decoder 70 for use with coder 60. In this arrangement the separate pulse streams $s_1$ and $s_2$ are combined in summing network 71 to improve the signal-to-noise ratio, and optionally regenerated in regenerator 72. The combined signals are then separated by means of AND-gates 73 and 74, which are enabled by appropriately phased clock pulse trains 1 and 2 synchronized with the sample pulse trains $S_1'$ and $S_2'$. The original width digital signals $S_1$ and $S_2$ are reconstituted by means of pulse generators 75 and 76.

When one transmission link is interrupted, the signal-to-noise ratio at the regenerator drops. However, so long as it remains above the minimum for which the regenerator is designed, both input signals are readily recovered.

Figure 13:
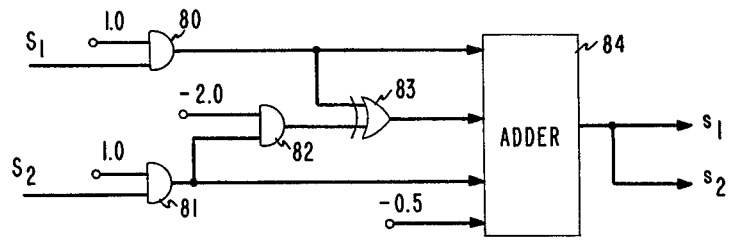

FIG. 13 shows an alternate encoding scheme for fail-safe transmission in which digital signals are mapped into a multilevel pulse stream at the same baud rate for transmission along two or more transmission links. For purposes of illustration, two input signals $S_1$ and $S_2$ are mapped into an output pulse stream for transmission along two links. However, a larger number of input binary, or multilevel input streams can be used with correspondingly more levels in the multilevel output pulse stream. In addition, the output stream can be sent over more than two links for an improved signal-to-noise ratio at the receiver during a failure condition.

In the illustrative embodiment, the coder includes three AND-gates 80, 81 and 82, an exclusive OR-gate 83, and an adder 84. The resulting coding matrix is as given in Table I.

TABLE I

|  |  | $S_2$ | |
|---|---|---|---|
|  |  | Mark | Space |
| $S_1$ | Mark | 1.5 | 0.5 |
|  | Space | −1.5 | −0.5 |

When signal $S_1$ includes a mark and signal $S_2$ a space, gate 80 is enabled while gates 81 and 82 are disabled, resulting in a unit signal being applied to adder 84 along with a −0.5 unit signal to produce an output signal $s_1 = s_2 = 0.5$. Conversely, when signal $S_2$ is a mark and $S_1$ a space, gate 80 is disabled while gates 81, 82 and 83 are enabled, producing a −1.5 unit output signal. Similarly, a mark for both signals produces a signal of 1.5 units whereas a space for both produces a signal of −0.5 units.

Figure 14:
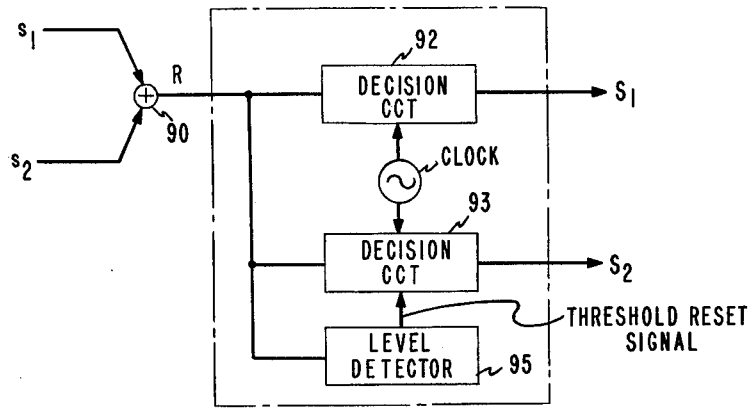

It will be noted in Table I that regardless of the state of signal $S_2$ (i.e., mark or space), the encoded signal is greater than zero when $S_1$ is a mark, and less than zero when $S_1$ is a space. Similarly, regardless of the state of $S_1$, the absolute value of the encoded signal is greater than unity when $S_2$ is a mark, and less than unity when $S_2$ is a space. Thus, a decoder can be as illustrated in FIG. 14, comprising means 90 for combining the two identical transmitted signals $s_1$ and $s_2$, and a pair of decision circuits 92 and 93. To recover signal $S_1$, the decoding decisions for decision circuit 92 are, as given above. That is, $S_1$ is a mark when the output, R, from adder 90 is greater than 0. It is a space when $R < 0$. To recover signal $S_2$, decision circuit 93 examines the absolute value of R such that an output mark is produced when $|R| > 1$, and an output space is produced when $|R| < 1$.

In the event of a failure in one of the two transmission paths, the magnitude of signal R is halved. While this does not affect the operation of decision circuit 92, it does require a change in the decision reference of decision circuit 93. This can be provided for by means of a level detector 95 which senses this change and provides a suitable threshold reset signal to reset the decision reference level in circuit 93. Alternatively, AGC means can be employed to maintain a constant level of input signal to circuit 93.

Figure 15:
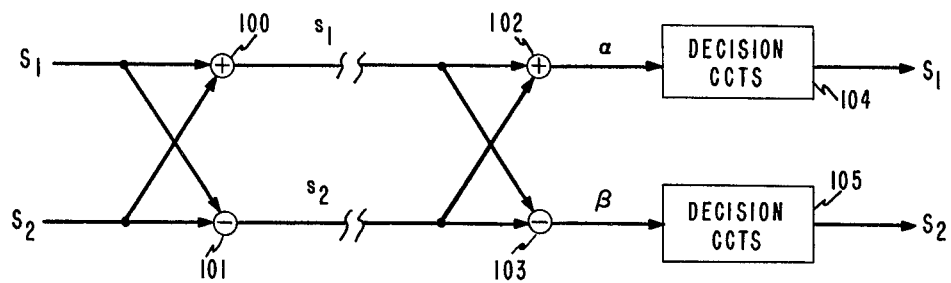
FIGS. 13, 14 and 15 show alternate coding and decoding arrangements.

FIG. 15 shows still another coding and decoding configuration wherein the mark values for the two input signals are different. For example, in pulse stream $S_1$, the mark value is A, and the space value is 0. In pulse stream $S_2$, the mark value is B, and the space value is 0. At the coder, signals $S_1$ and $S_2$ are added in adder 100 to form a first encoded signal $s_1$, and subtracted in a differencing circuit 101 to form a second encoded signal $s_2$. The resulting signals $s_1$ and $s_2$ are as given in Tables II and III.

TABLE II

| | | Signal $s_1$ | |
|---|---|---|---|
| | | $S_2$ | |
| | | Mark | Space |
| $S_1$ | Mark | A + B | A |
| | Space | B | 0 |

TABLE III

| | | Signal $s_2$ | |
|---|---|---|---|
| | | $S_2$ | |
| | | Mark | Space |
| $S_1$ | Mark | A − B | A |
| | Space | −B | 0 |

At the decoder, the received signals $s_1$ and $s_2$ are added in a second adder 102 to produce a third signal $\alpha$ and subtracted in a second differencing circuit 103 to produce a fourth signal $\beta$, as given in Tables IV and V, respectively.

TABLE IV

| | | Signal $\alpha$ | |
|---|---|---|---|
| | | $s_2$ | |
| | | Mark | Space |
| $s_1$ | Mark | 2A | 2A |
| | Space | 0 | 0 |

TABLE V

| | | Signal $\beta$ | |
|---|---|---|---|
| | | $s_2$ | |
| | | Mark | Space |
| $s_1$ | Mark | 2B | 0 |
| | Space | 2B | 0 |

Thus, with both transmission links operating normally, signal $\alpha$ gives the $S_1$ bit stream directly, and signal $\beta$ gives the $S_2$ bit stream directly. If, however, one of the links is interrupted, each of the output signals $\alpha$ and $\beta$ includes components of both input signals. For example, if the $s_2$ transmission link fails, the $\alpha$ signal becomes equal to $s_1$ and $\beta$ becomes equal to $-s_1$. Further, assuming for purposes of illustration that $A=1$ and $B=\frac{1}{2}$, the $\alpha$ signal, as a function of input signals $S_1$ and $S_2$, is as given by Table VI.

TABLE VI

| | | Signal $\alpha$ | |
|---|---|---|---|
| | | $S_2$ | |
| | | Mark | Space |
| $S_1$ | Mark | 1.5 | 1.0 |
| | Space | 0.5 | 0 |

For this illustrative case, the decision table is as follows:
If:
  $\alpha > 0.75$, $S_1$ is a mark;
  $\alpha < 0.75$, $S_1$ is a space;
If: $\alpha > 1.25$; or $0.25 < \alpha < 0.75$, $S_2$ is a mark;
If: $\alpha < 0.25$, or $0.75 < \alpha < 1.25$, $S_2$ is a space.

Thus, suitable decision circuits 105 and 104, adapted for the particular signal parameters are located at the outputs of adder 102 and differencing circuit 103, respectively, to recover the input bit streams $S_1$ and $S_2$.

Similarly, Table VII is for the case in which the $s_1$ transmission link fails and the $s_2$ signal is used to recover the input signals $S_1$ and $S_2$.

TABLE VII

| | | Signal $\beta$ | |
|---|---|---|---|
| | | $S_2$ | |
| | | Mark | Space |
| $s_1$ | Mark | 0.5 | 1 |
| | Space | −0.5 | 0 |
| | If: $\beta > 0.75$ | $s_2$ = space | |
| | | $s_1$ = mark | |
| | $0.25 < \beta < 0.75$ | $s_2$ = mark | |
| | | $s_1$ = mark | |
| | $-0.25 < \beta < 0.25$ | $s_2$ = space | |
| | | $s_1$ = space | |
| | $\beta < -0.25$ | $s_2$ = mark | |
| | | $s_1$ = space | |

SUMMARY OF THE INVENTION

A number of specific coding and decoding schemes have been described for providing fail-safe transmission without the need for standby facilities which normally produce no revenue. In accordance with the invention, fail-safe transmission is achieved by coding each input signal such that all or a part of its information content is transmitted over at least two transmission links. With all transmission links operating normally, all of the input signals are readily recovered at the receiver. When one or more transmission links fail, the bandwidth or signal-to-noise ratio may be somewhat degraded, but all the signals are nevertheless recovered.

I claim:

1. A fail-safe system for transmitting a multiplicity of n input signals over an equal multiplicity of n transmission links comprising:
    means for encoding said input signals into n encoded signals such that at least two of said n encoded signals contain sufficient information to permit recovery of each of said input signals from each of said at least two encoded signals;
    each of said encoded signals being transmitted along a different one of said multiplicity of transmission links;
    and a decoder at the output end of said links for recovering said input signals.

2. The system according to claim 1 wherein said means (11) for encoding comprises:
    means (50, 51, 52, 53) for sampling each of said n input signals ($S_1$, $S_2$, $S_3$) so as to produce n pulse trains of samples displaced in time relative to each other;
    means for multiplexing a pulse train of each input signal with a pulse train of each of the other of said input signals to produce n encoded signals ($s_1$, $s_2$, $s_3$), each of which includes samples of all said input signals.

3. The system according to claim 1 wherein said means (11) for encoding comprises:
    means (61, 62, 63) for sampling each of said n input signals ($S_1$, $S_2$) at different instants in time to produce n sample pulse trains ($S_1'$, $S_2'$);
    means (64) for adding said sample pulse trains together and coupling the output from said adding means to each of n transmission links (13.1, 13.2).

4. The system according to claim 3 wherein said decoder (12) comprises:

means (71) for combining the signals ($s_1 = s_2 = S_1' + S_2'$) on said multiplicity of transmission links (13.1, 13.2);

and means (73, 74, 77), synchronized with said sample pulse trains ($S_1'$, $S_2'$), for separating said sample pulse trains coupled to the output of said combining means (71).

5. The system according to claim 1 wherein said means (11) for encoding comprises:

means (80, 81, 82, 83, 84) for encoding said input signals ($S_1$, $S_2$) into a multilevel pulse stream for transmission along said multiplicity of transmission links (13.1, 13.2).

6. The system according to claim 5 wherein said decoder (12) comprises:

means (90) for combining the signals ($s_1$, $s_2$) on said multiplicity of transmission links (13.1, 13.2);

and decision circuits (92, 93), coupled to the output of said combining means (90), for recovering said input signals ($S_1$, $S_2$).

7. The system according to claim 1 wherein:

said means (11) for encoding comprises:

first means (100) for adding a first input signal ($S_1$) to a second input signal ($S_2$) to form a first encoded signal ($s_1$) for transmission along one of said transmission links;

first means (101) for subtracting said second input signal ($S_2$) from said first input signal ($S_1$) to form a second encoded signal ($s_2$) for transmission along a second of said transmission links;

and said decoder (12) comprises:

second means (102) for adding said first and second encoded signals ($s_1$, $s_2$) to form a sum signal ($\alpha$);

second means (103) for subtracting said second encoded signal ($s_2$) from said first encoded signal ($s_1$) to form a difference signal ($\beta$);

a first decision circuit (104) for recovering said first input signal ($S_1$) from said sum signal ($\alpha$);

and a second decision circuit (105) for recovering said second input signal ($S_2$) from said difference signal ($\beta$).

* * * * *